(12) United States Patent
Tal et al.

(10) Patent No.: US 12,099,443 B1
(45) Date of Patent: Sep. 24, 2024

(54) MULTI-MODAL WRITE CACHE FOR DATA STORAGE SYSTEM

(71) Applicant: Dell Products L.P., Round Rock, TX (US)

(72) Inventors: Doron Tal, Geva Carmel (IL); Yosef Shatsky, Karnei Shomron (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/351,836

(22) Filed: Jul. 13, 2023

(51) Int. Cl.
*G06F 12/08* (2016.01)
*G06F 12/0802* (2016.01)

(52) U.S. Cl.
CPC ................. *G06F 12/0802* (2013.01)

(58) Field of Classification Search
None
See application file for complete search history.

(56) References Cited

U.S. PATENT DOCUMENTS

| | | | |
|---|---|---|---|
| 5,381,539 A | 1/1995 | Yanai et al. |
| 5,551,003 A | 8/1996 | Mattson et al. |
| 5,764,880 A | 6/1998 | Gerdt et al. |
| 6,052,799 A | 4/2000 | Li et al. |
| 6,941,420 B2 | 9/2005 | Butterworth et al. |
| 8,843,676 B2 | 9/2014 | Rajamanickam et al. |
| 9,372,751 B2 | 6/2016 | McNutt |
| 9,514,014 B2 | 12/2016 | Webman et al. |
| 9,892,045 B1 | 2/2018 | Douglis et al. |
| 10,078,598 B1 | 9/2018 | Wallace et al. |
| 10,331,561 B1 | 6/2019 | Shilane et al. |
| 10,445,180 B2 | 10/2019 | Butterworth et al. |
| 10,986,174 B1 | 4/2021 | Sharma et al. |
| 11,119,668 B1 | 9/2021 | Keller et al. |
| 11,144,399 B1 | 10/2021 | Yarimi et al. |
| 11,163,479 B2 | 11/2021 | Lieblich et al. |

(Continued)

FOREIGN PATENT DOCUMENTS

| | | |
|---|---|---|
| WO | 2015108670 A1 | 7/2015 |
| WO | 2020204880 A1 | 10/2020 |

(Continued)

OTHER PUBLICATIONS

International Search Report and Written Opinion of PCT/US2019/024885 dated Jan. 7, 2020, 13 pages.

(Continued)

*Primary Examiner* — Kaushikkumar M Patel
(74) *Attorney, Agent, or Firm* — Ryan, Mason & Lewis, LLP

(57) ABSTRACT

Techniques are provided for implementing and managing a multi-modal write cache for a data storage system. For example, a storage control system is configured to perform a write caching method which comprises the storage control system receiving an input/output (I/O) write request from a client application to write data to a primary storage volume, comparing a current I/O workload associated with the client application to an I/O workload threshold, and writing the data of the I/O write request to one of (i) a persistent write cache in a persistent storage volume and (ii) a non-persistent write cache in a non-persistent storage volume, based at least in part on a result of comparing the current I/O workload to the I/O workload threshold.

20 Claims, 6 Drawing Sheets

(56) References Cited

U.S. PATENT DOCUMENTS

| | | | |
|---|---|---|---|
| 11,163,699 | B2 | 11/2021 | Keller et al. |
| 11,221,975 | B2 | 1/2022 | Puder et al. |
| 11,262,933 | B2 | 3/2022 | Matosevich et al. |
| 11,301,162 | B2 | 4/2022 | Matosevich et al. |
| 11,307,935 | B2 | 4/2022 | Keller et al. |
| 11,372,810 | B2 | 6/2022 | Keller et al. |
| 11,416,396 | B2 | 8/2022 | Shatsky et al. |
| 11,418,589 | B1 | 8/2022 | Spiegelman |
| 11,487,432 | B2 | 11/2022 | Aharoni et al. |
| 11,487,460 | B2 | 11/2022 | Keller et al. |
| 11,513,997 | B2 | 11/2022 | Keller et al. |
| 11,550,479 | B1 | 1/2023 | Shatsky et al. |
| 11,573,736 | B2 | 2/2023 | Matosevich et al. |
| 11,606,429 | B2 | 3/2023 | Aharoni et al. |
| 11,609,854 | B1 | 3/2023 | Shatsky et al. |
| 11,630,773 | B1 | 4/2023 | Shatsky et al. |
| 11,636,089 | B2 | 4/2023 | Aharoni et al. |
| 11,650,920 | B1 | 5/2023 | Shatsky et al. |
| 11,675,789 | B2 | 6/2023 | Shatsky et al. |
| 11,687,536 | B2 | 6/2023 | Sharma et al. |
| 11,704,053 | B1 | 7/2023 | Tal et al. |
| 11,704,160 | B2 | 7/2023 | Shatsky et al. |
| 2002/0032835 | A1 | 3/2002 | Li et al. |
| 2008/0021853 | A1 | 1/2008 | Modha et al. |
| 2009/0204761 | A1 | 8/2009 | Caprioli et al. |
| 2009/0276593 | A1 | 11/2009 | Jacobson et al. |
| 2013/0305002 | A1 | 11/2013 | Hallak et al. |
| 2014/0047263 | A1* | 2/2014 | Coatney ............. G06F 11/2092 711/119 |
| 2014/0215147 | A1 | 7/2014 | Pan |
| 2014/0215262 | A1 | 7/2014 | Li et al. |
| 2014/0244935 | A1 | 8/2014 | Ezra et al. |
| 2016/0103764 | A1 | 4/2016 | Banerjee et al. |
| 2017/0344575 | A1* | 11/2017 | Naylor ................ G06F 12/0813 |
| 2018/0113640 | A1 | 4/2018 | Fernandez et al. |
| 2018/0267893 | A1 | 9/2018 | Barzik et al. |
| 2018/0300075 | A1 | 10/2018 | Fernandez et al. |
| 2019/0163587 | A1 | 5/2019 | Anna et al. |
| 2019/0227845 | A1 | 7/2019 | Sridhar et al. |
| 2020/0133503 | A1 | 4/2020 | Sun et al. |
| 2021/0279187 | A1 | 9/2021 | Puder et al. |
| 2021/0294505 | A1 | 9/2021 | Keller et al. |
| 2021/0294774 | A1 | 9/2021 | Keller et al. |
| 2021/0294775 | A1 | 9/2021 | Keller et al. |
| 2021/0303160 | A1 | 9/2021 | Lieblich et al. |
| 2021/0303169 | A1 | 9/2021 | Tagar et al. |
| 2021/0303202 | A1 | 9/2021 | Ben Zeev et al. |
| 2021/0303401 | A1 | 9/2021 | Yarimi et al. |
| 2021/0303407 | A1 | 9/2021 | Keller et al. |
| 2021/0303480 | A1 | 9/2021 | Keller et al. |
| 2021/0373796 | A1 | 12/2021 | Matosevich et al. |
| 2022/0004320 | A1 | 1/2022 | Matosevich et al. |
| 2022/0035788 | A1 | 2/2022 | Aharoni et al. |
| 2022/0113867 | A1 | 4/2022 | Aharoni et al. |
| 2022/0114184 | A1 | 4/2022 | Sharma et al. |
| 2022/0116454 | A1 | 4/2022 | Aharoni et al. |
| 2022/0121458 | A1 | 4/2022 | Moran et al. |
| 2022/0129380 | A1 | 4/2022 | Shatsky et al. |
| 2022/0171567 | A1 | 6/2022 | Matosevich et al. |
| 2022/0187991 | A1 | 6/2022 | Keller et al. |
| 2022/0222113 | A1 | 7/2022 | Shatsky et al. |
| 2022/0342758 | A1 | 10/2022 | Tal et al. |
| 2022/0350497 | A1 | 11/2022 | Matosevich et al. |
| 2022/0358018 | A1 | 11/2022 | Bar Shalom et al. |
| 2022/0405254 | A1 | 12/2022 | Shatsky et al. |
| 2022/0414102 | A1 | 12/2022 | Shatsky et al. |
| 2023/0106879 | A1* | 4/2023 | Ryman ................ H04L 67/133 718/1 |
| 2023/0127321 | A1 | 4/2023 | Shatsky et al. |
| 2023/0139729 | A1* | 5/2023 | Barczak ............. G06F 12/0846 711/118 |
| 2023/0367677 | A1* | 11/2023 | Pawar ................ G06F 9/4411 |
| 2024/0103898 | A1* | 3/2024 | Tal ..................... G06F 12/0868 |

FOREIGN PATENT DOCUMENTS

| | | | |
|---|---|---|---|
| WO | 2020204882 A1 | 10/2020 | |
| WO | WO-2024102133 A1 * | 5/2024 | |

OTHER PUBLICATIONS

International Search Report and Written Opinion of PCT/US2019/024900 dated Jan. 7, 2020, 12 pages.

Dell EMC, "EMC ScaleIO Basic Architecture Documentation," Technical White Paper, Mar. 2017, 22 pages.

EMC2, "EMC ScaleIO Design Considerations and Best Practices," Technical White Paper, Jun. 2016, 30 pages.

I. Koltsidas et al., "SoftwAre Log-Structured Array (SALSA)—A Unified Stack for SSDs and SMR Disks," IBM Research Report, Dec. 2, 2015, 13 pages.

S. M. Rumble et al., "Log-Structured Memory for DRAM-Based Storage," Proceedings of the 12th USENIX Conference on File and Storage Technologies, Santa Clara, CA, Feb. 17-20, 2014, 17 pages.

Dell EMC, "Dell EMC VxFlex Family Overview," Technical White Paper, May 2019, 44 pages.

J. Nakano et al., "ReViveI/O: Efficient Handling of I/O in Highly-Available Rollback-Recovery Servers," IEEE Symposium on High-Performance Computer Architecture, Feb. 11-15, 2006, pp. 200-211.

Wikipedia, "Raft (Computer Science)," https://en.wikipedia.org/wiki/Raft_(computer_science), Feb. 10, 2020, 4 pages.

Wikipedia, "Paxos (Computer Science)," https://en.wikipedia.org/wiki/Paxos_(computer_science), Dec. 6, 2019, 21 pages.

Wikipedia, "State Machine Replication," https://en.wikipedia.org/wiki/State_machine_replication, Dec. 14, 2019, 9 pages.

Dell Technologies, "Dell EMC PowerFlex: Secure Snapshots," Technical White Paper, Jul. 2020, 17 pages.

Dell Technologies, "Dell EMC PowerFlex: Protected Maintenance Mode," Technical White Paper, Jul. 2020, 20 pages.

Dell Technologies, "Dell EMC PowerFlex: Introduction to Replication," Technical White Paper, Jun. 2020, 34 pages.

Dell Technologies, "Dell EMC PowerFlex: Networking Best Practices and Design Considerations," Best Practices, Jun. 2020, 64 pages.

Dell EMC, "Getting To Know Dell EMC PowerFlex," Version 3.5.x, Rev. 02, Jan. 2021, 66 pages.

Dell EMC, "Dell EMC VxRack FLEX," Dell EMC Product Overview, Apr. 2018, 5 pages.

G. Soundararajan et al., "Dynamic Resource Allocation for Database Servers Running on Virtual Storage," FAST 2009: Proceedings of the 7th conference on File and storage technologies, Feb. 2009, pp. 71-84.

U.S. Appl. No. 17/583,365 filed in the name of Doron Tal et al. filed Jan. 25, 2022, and entitled "Data Deduplication in a Storage System."

U.S. Appl. No. 17/583,787 filed in the name of Michal Yarimi et al. filed Jan. 25, 2022, and entitled "Intelligent Defragmentation in a Storage System."

U.S. Appl. No. 17/681,449 filed in the name of Yosef Shatsky et al. filed Feb. 25, 2022, and entitled "Optimization for Garbage Collection in a Storage System."

U.S. Appl. No. 17/726,853 filed in the name of Irit Brener-Shalem et al. filed Apr. 22, 2022, and entitled "Intelligent Load Scheduling in a Storage System."

U.S. Appl. No. 17/729,219 filed in the name of Yosef Shatsky et al. filed Apr. 26, 2022, and entitled "Load Distribution in a Data Storage System."

U.S. Appl. No. 17/853,364 filed in the name of Yosef Shatsky et al. filed Jun. 29, 2022, and entitled "Managing Lookup Operations of a Metadata Structure for a Storage System."

U.S. Appl. No. 17/864,579 filed in the name of Yosef Shatsky et al. filed Jul. 14, 2022, and entitled "Managing Granularity of a Metadata Structure for a Storage System."

U.S. Appl. No. 17/868,045 filed in the name of Yosef Shatsky et al. filed Jul. 19, 2022, and entitled "Managing Insert Operations of a Metadata Structure for a Storage System."

(56) References Cited

OTHER PUBLICATIONS

U.S. Appl. No. 17/969,875 filed in the name of Yosef Shatsky et al. filed Oct. 20, 2022, and entitled "Multiple-Instance Write Cache for a Storage System."
U.S. Appl. No. 18/090,792 filed in the name of Christopher Trudel et al. filed Dec. 29, 2022, and entitled "Cluster Management in Large-Scale Storage Systems."
U.S. Appl. No. 18/092,516 filed in the name of Igal Moshkovich et al. filed Jan. 3, 2023, and entitled "Managing Data on Shutdown of Storage System."
U.S. Appl. No. 18/138,415 filed in the name of Yosef Shatsky et al. filed Apr. 24, 2023, and entitled "Dynamic Reserve Capacity in Storage Systems."

* cited by examiner

MULTI-MODAL WRITE CACHE FOR DATA STORAGE SYSTEM

TECHNICAL FIELD

This disclosure relates generally to data storage systems and, more particularly, to techniques for managing write caches in data storage systems.

BACKGROUND

State-of-the-art data storage systems are designed with the goal of enhancing storage efficiency and performance. For example, storage systems typically implement a write cache (alternatively, write buffer or write log) for expediting input/output (I/O) write requests. A write caching process generally involves writing incoming I/O data to a write cache, sending a write acknowledgment to a given user or host after the data is written to the write cache, and performing asynchronous operations to ultimately store the cached I/O write data to a primary storage. A typical approach for implementing write caching includes writing data to some persistent media, e.g., byte-addressable, non-volatile RAM-based memory media hardware as persistent memory (PMEM) modules, nonvolatile dual in-line memory modules (NVDIMMs), and other types of persistent memory modules, etc. In many cases, the use of a write cache is an architectural underpinning of a data storage system for accelerating write acknowledgment, rather than an optional feature. When implementing storage in a public cloud data center, however, the ability to implement a persistent write cache is problematic because persistent memory such as PMEM is not provided by public cloud vendors, and local storage is typically implemented using non-persistent storage volumes (e.g., ephemeral storage volumes) which are lost upon server failures. While public cloud venders do offer various types of persistent storage volumes that differ in resiliency and performance, the use of persistent storage volumes to implement write caches is not ideal since the financial cost associated with persistent storage volumes depends on a provisioned performance.

SUMMARY

Exemplary embodiments of the disclosure include techniques for implementing and managing a multi-modal write cache for a data storage system. For example, an exemplary embodiment includes a method that is performed by a storage control system. The storage control system receives an I/O write request from a client application to write data to a primary storage volume, compares a current I/O workload associated with the client application to an I/O workload threshold, and writes the data of the I/O write request to one of (i) a persistent write cache in a persistent storage volume and (ii) a non-persistent write cache in a non-persistent storage volume, based at least in part on a result of comparing the current I/O workload to the I/O workload threshold.

In another exemplary embodiment, the storage control system compares the current I/O workload associated with the client application to the I/O workload threshold by determining whether the current I/O workload associated with the client application exceeds the I/O workload threshold. In response to determining that the current I/O workload does not exceed the I/O workload threshold, the data of the I/O write request is written to the persistent write cache in the persistent storage volume, and in response to determining that the current I/O workload does exceed the I/O workload threshold, the data of the I/O write request is written to the non-persistent write cache in the non-persistent storage volume.

Another exemplary embodiment includes a cloud computing system which comprises a distributed data storage system comprising a plurality of storage nodes. At least one storage node comprises at least one processing device, and memory to store program instructions that are executed by the at least one processing device to implement a storage control system that is configured to perform a write caching process. In performing the write caching process, the storage control system is configured to receive an I/O write request from a client application to write data to a primary storage volume, compare a current I/O workload associated with the client application to an I/O workload threshold, and write the data of the I/O write request to one of (i) a persistent write cache in a persistent storage volume and (ii) a non-persistent write cache in a non-persistent storage volume, based at least in part on a result of comparing the current I/O workload to the I/O workload threshold.

In some embodiments, the I/O workload threshold comprises a provisioned I/O performance metric associated with the persistent storage volume attached to the client application. The provisioned I/O performance metric comprises at least one of a provisioned I/O per second (IOPS) and an I/O throughput.

In an exemplary embodiment, the plurality of storage nodes comprises a first group of storage nodes that are located in a first availability zone, and a second group of storage nodes that are located in a second availability zone. In writing the data of the I/O write request to the non-persistent write cache in the persistent storage volume, the storage control system is configured to: write the data to a primary non-persistent write cache in a first non-persistent storage volume in a storage node in the first availability zone; and write a copy of the data to a secondary non-persistent write cache in a second non-persistent storage volume in a storage node in the second availability zone.

In another exemplary embodiment, in writing the data of the I/O write request to the persistent write cache in the persistent storage volume, the storage control system is configured to: write the data to a primary persistent write cache in a first persistent storage volume in the first availability zone; and write a copy of the data to a secondary persistent write cache in a second persistent storage volume in the first availability zone.

Other embodiments will be described in the following detailed description of exemplary embodiments, which is to be read in conjunction with the accompanying figures.

DETAILED DESCRIPTION

Figure 1:
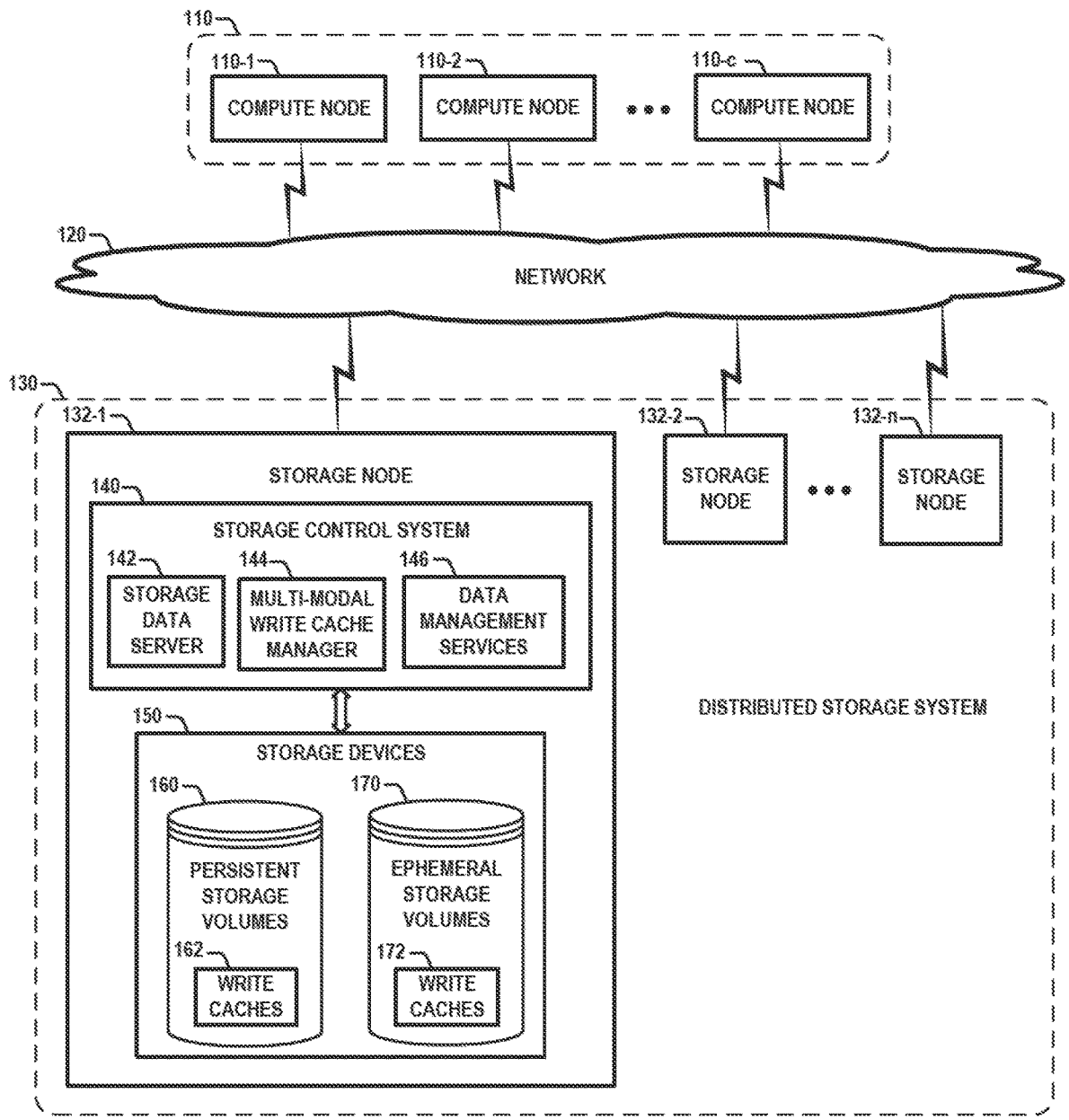
FIG. 1 schematically illustrates a network computing environment which comprises a storage system that is configured to perform multi-modal write caching, according to an exemplary embodiment of the disclosure.

Exemplary embodiments of the disclosure will now be described in further detail with regard to techniques for implementing and managing a multi-modal write cache for a data storage system. For example, exemplary embodiments of the disclosure include systems and methods for implementing and managing multi-modal write caches in public cloud-based storage systems which utilize both persistent write caches and non-persistent write caches in persistent and non-persistent storage volumes, to support write caching. As explained in further detail below, the exemplary multi-modal write caching techniques as described herein are particularly advantageous for use in public cloud-based datacenters to provide a cost-effective method for implementing persistent and resilient write caches for accelerating write acknowledgment in a cloud-based storage system.

For purposes of illustration, exemplary embodiments will be described herein with reference to exemplary network computing systems with distributed storage systems and data processing systems, which implement associated computers, servers, storage devices and other processing devices. It is to be appreciated, however, that these and other embodiments are not restricted to the particular illustrative system and device configurations shown. Accordingly, the term "network computing system" as used herein is intended to be broadly construed, so as to encompass, for example, processing systems comprising cloud computing and storage systems, as well as other types of processing systems comprising various combinations of physical and virtual processing resources. A network computing system may therefore comprise, for example, at least one data center or other cloud-based systems that include one or more cloud systems that host multiple tenants which share cloud resources. Numerous different types of enterprise computing and storage systems are also encompassed by the term "network computing system" as that term is broadly used herein.

Information technology (IT) is widely used by all types of business enterprises for various purposes. Typically, business enterprises utilize compute, storage, and network resources, which are provided by third-party cloud service providers over the internet, to implement cloud-based datacenters for running their websites and applications and managing data on the cloud. For example, third-party public cloud service providers, such as Amazon Web Services (AWS), Microsoft Azure, Google Cloud, etc., provide cloud services using or more of various cloud computing service models, such as Infrastructure-as-a-Service (IaaS), Platform-as-a-Service (PaaS), etc. Such cloud computing service models allow customers (e.g., business enterprises) to rent or lease compute, storage, and network resources to implement datacenters and host applications. Such cloud-based resources can be rented or leased based on different price models including, but not limited to, on-demand use (i.e., pay only for what is used), scheduled use for a defined time period (e.g. daily, weekly or monthly basis), etc.

Furthermore, the financial costs for cloud storage resources can vary depending on the type of storage and/or level of storage performance (e.g., provisioned I/O operations per second (IOPS), I/O throughput (e.g., write throughput), and/or other storage performance metrics), which are requested by customers for their applications. For example, cloud-based storage providers typically offer different types of storage volumes, such as persistent storage volumes and non-persistent storage volumes, for storing and managing logical storage resources (e.g., logical storage volumes, logical block devices, logical operating system disks, etc.) and associated data. A cloud customer can attach persistent storage volumes and/or non-persistent storage volumes to application instances of the customer which run on compute nodes in the cloud data center.

In particular, non-persistent storage volumes (e.g., ephemeral storage) comprise volatile temporary storage which is attached to application instances (e.g., virtual machines), wherein the non-persistent storage volumes and associated data are only present during the running lifetime of the application instance. In circumstances where an application instance is stopped or terminated or if there is some failure of the underlying hardware, the data of the non-persistent storage volume (which is attached to the application instance) is not saved and is lost. In this regard, ephemeral storage resources (e.g., ephemeral storage volumes, ephemeral block devices, etc.) are non-persistent storage resources that are attached to active application instances and exist only during the running lifetime of the application instances. Typically, ephemeral storage is a non-billable resource that is included in the cost of the application instance and is ideally used for any temporary data such as cache for data stored in a persistent storage layer, buffers, session data, swap volume, etc. In addition, multiple ephemeral storage volumes for an application instance can be distributed over multiple storage nodes and implemented as, e.g., RAID volumes and for specific jobs where high performance and crucial processing and sharing of data across multiple nodes is needed or desired. In this regard, multiple ephemeral storage volumes can be attached to the same instance across nodes.

In contrast to ephemeral storage, persistent storage volumes are always available or recoverable. More specifically, with persistent storage, the logical storage resources and associated data, which are associated with a given virtual machine instance or application instance, are saved (persisted) when the given virtual machine or application instance is deleted, stopped, terminated, etc., such that persistent storage volumes and associated data are always available, regardless of the state of the application instance. The financial costs associated with cloud-based persistent storage volumes can depend on various factors including, but not limited to, the type of storage media (e.g., SSD drives, HDD drives, etc.) used to implement the persistent storage volumes, the provisioned capacity, and/or the provisioned performance for the persistent storage.

While persistent storage volumes in the cloud can be utilized alone to implement persistent write caches, this option alone is not ideal when, for example, the cost of the persistent storage volumes depends on provisioned performance. In this instance, the costs associated with the use of persistent storage volumes for storing data and for implementing a write cache is based on customer's need to pay for a certain level of provisioned I/O performance to meet anticipated maximum (peak) I/O performance demands based at least in part on the I/O workload profile of the customer's application, wherein the price for provisioning the performance is often higher than the price for the capacity. In this instance, burst write caching and I/O workloads that exceed the provisional performance may be throttled back to comply with the maximum provisioned performance. Another option for write caching in the cloud is to utilize only non-persistent storage volumes wherein write caches are replicated/mirrored across different storage nodes or failure domains (e.g., availability zones) to achieve resiliency by exploiting the fact that concurrent failures are unlikely. However, this approach alone is not ideal as it adds higher latency for replicating/mirroring the data to a remote storage node across failure domains and increases the customer cost as a result of the added network traffic.

Exemplary embodiments for multi-modal write caching in public cloud-based storage systems are based on a hybrid solution in which both persistent and non-persistent write caches are utilized to support write caching. A persistent write cache is implemented in persistent storage volumes and utilized for write caching of I/O write data for a base I/O workload (e.g., a workload that does not exceed a maximum I/O workload threshold (e.g., a provisioned I/O performance). The persistent write cache allows the storage system to achieve low latency write acknowledgments and avoid added network cost for replicating/mirroring the write cache data over different storage nodes in different fault domains (e.g., availability zones). On the other hand, a non-persistent write cache is implemented in non-persistent storage volumes and is utilized for write caching of I/O write data for I/O workloads that exceed the base I/O workload (e.g., exceed a maximum I/O workload threshold), wherein the non-persistent write cache is implemented by mirroring the non-persistent write cache across different fault domains (e.g., availability-zones). For each incoming I/O write request, a multi-modal cache system will decide which of the two write-caches to use based on, e.g., a current I/O workload of the client application(s) which are attached to the persistent and non-persistent storage volumes.

With the multi-modal caching, the persistent write cache in the persistent storage volumes is utilized to satisfy a base load corresponding to a maximum provisioned performance for the persistent storage volumes, which is already paid for by a customer, while the non-persistent write cache in the non-persistent storage volumes is utilized to cache I/O write data during periods where there are bursts in I/O workload. In this instance, the customer can reduce cost for use of persistent storage by, e.g., minimizing the maximum provisioned performance for the persistent storage, while using the non-persistent write cache across fault domains to cache I/O write data during burst I/O workloads, where the added network traffic cost to the customer is an on-demand per-use basis, e.g., network traffic cost based on number of bytes transmitted over the network.

FIG. 1 schematically illustrates a network computing environment which comprises a storage system that is configured to perform multi-modal write caching, according to an exemplary embodiment of the disclosure. In particular, FIG. 1 schematically illustrates a network computing environment 100 which comprises a plurality of compute nodes 110-1, 110-2, . . . 110-c (collectively, compute nodes 110), a communications network 120, and a distributed storage system 130 comprising a cluster of storage nodes 132-1, 132-2, . . . , 132-n (collectively, storage nodes 132). As further shown in FIG. 1, the storage node 132-1 comprises a storage control system 140, and storage devices 150. In some embodiments, the storage control system 140 comprises a software-defined storage system, wherein the storage control system 140 comprises various software components including, but not limited to, a storage data server 142, a multi-modal write cache manager 144, and other software-based data management services 146, the functions of which will be explained below. In some embodiments, the storage nodes 132-2 . . . 132-n have the same or similar configuration as the storage node 132-1 shown in FIG. 1.

The storage devices 150 of a given storage node 132 can be, e.g., internal storage devices and/or direct-attached storage devices, and may comprise one or more of various types of storage devices such as hard-disk drives (HDDs), solid-state drives (SSDs), flash memory cards (e.g., PCIe cards), or other types of non-volatile memory (NVM) devices including, but not limited to, non-volatile random-access memory (NVRAM), phase-change RAM (PC-RAM), magnetic RAM (MRAM), and other types of storage media, etc. In some embodiments, the storage devices 150 comprise flash memory devices such as NAND flash memory, NOR flash memory, etc. The NAND flash memory can include single-level cell (SLC) devices, multi-level cell (MLC) devices, triple-level cell (TLC) devices, or quad-level cell (QLC) devices. These and various combinations of multiple different types of storage devices 150 may be implemented on each storage node 132. In this regard, the term "storage device" as used herein should be broadly construed to encompass all types of storage media including hybrid drives. On a given storage node 132, the storage control system 140 is configured to communicate with the storage devices 150 through any suitable host interface, e.g., a host bus adapter, using suitable protocols such as Advanced Technology Attachment (ATA), serial ATA (SATA), external SATA (eSATA), parallel ATA (PATA), non-volatile memory express (NVMe), small computer system interface (SCSI), serial attached SCSI (SAS), peripheral component interconnect express (PCIe), etc. In the case of NVMe-based devices, such devices can be configured to comprise ephemeral storage resources (e.g., ephemeral storage volumes, ephemeral block devices, etc.), as explained in further detail below.

As illustrated in FIG. 1, the storage devices 150 of a given storage node 132 have storage capacity that is logically partitioned into logical storage volumes including persistent storage volumes 160 and ephemeral storage volumes 170 (generally, non-persistent storage volumes), where each of the logical storage volumes can be distributed over multiple storage devices of multiple storage nodes 132. The persistent storage volumes 160 comprise persistent write caches 162 and the ephemeral storage volumes 170 comprise non-persistent write caches 172. The persistent write caches 162 and the non-persistent write caches 172 are configured and managed by the multi-modal write cache manager 144 using methods as discussed herein.

The compute nodes 110 comprise physical server nodes and/or virtual server nodes which host and execute applications (e.g., application instances, virtual machines, containers, etc.) that are configured to process data and execute tasks/workloads and perform computational work, either individually, or in a distributed manner, to thereby provide compute services to one or more users (the term "user" herein is intended to be broadly construed so as to encompass numerous arrangements of human, hardware, software or firmware entities, as well as combinations of such entities). The application instances that run on the compute nodes 110 utilize the distributed storage system 130 to store user/application data. In some embodiments, the compute nodes 110 comprise application servers, database servers, etc. The compute nodes 110 can host virtual nodes such as virtual machines and hypervisors, and container systems. In some embodiments, the compute nodes 110 comprise a cluster of compute nodes of, e.g., an enterprise computing system, a cloud-based computing system, or other types of computing systems or information processing systems comprising multiple computing nodes associated with respective users.

The communications network 120 comprises one or more types of communications networks to enable communication between the compute nodes 110 and the storage nodes 132, as well as peer-to-peer communication between the storage nodes 132. In this regard, while the communications network 120 is generically depicted in FIG. 1, it is to be understood that the communications network 120 may comprise any known communication network such as, a global computer network (e.g., the Internet), a wide area network (WAN), a local area network (LAN), an intranet, a satellite network, a telephone or cable network, a cellular network, a wireless network such as Wi-Fi or WiMAX, a storage fabric (e.g., IP-based or Fiber Channel storage fabric), or various portions or combinations of these and other types of networks. In this regard, the term "network" as used herein is therefore intended to be broadly construed so as to encompass a wide variety of different network arrangements, including combinations of multiple networks possibly of different types, which enable communication using, e.g., Transfer Control Protocol/Internet Protocol (TCP/IP) or other communication protocols such as Fibre Channel (FC), FC over Ethernet (FCOE), RDMA over Converged Ethernet (RoCE), Internet Small Computer System Interface (iSCSI), Peripheral Component Interconnect express (PCIe), InfiniBand, Gigabit Ethernet, etc., to implement I/O channels and support storage network connectivity. Numerous alternative networking arrangements are possible in a given embodiment, as will be appreciated by those skilled in the art.

In some embodiments, each storage node 132 comprises a server node (e.g., storage-only node) that is implemented on, e.g., a physical server machine or storage appliance comprising hardware processors, system memory, and other hardware resources that execute software and firmware to implement the functionality of the storage node 132 and the associated storage control system 140. In some embodiments, each storage node 132 comprises a plurality of control processors which execute a lightweight operating system (e.g., a customized lightweight Linux kernel) and functional software (e.g., software-defined storage software) to implement functions of the storage control system 140, as discussed in further detail below. In some embodiments, a converged infrastructure can be implemented to provide a single-layer deployment in which the application layer (implemented by compute nodes 110) and the storage layer (implemented by the storage node 132) are deployed on the same server nodes in the network computing environment 100 such that each server node is a data storage consumer (compute node) and a data storage supplier (storage node).

The distributed storage system 130 may comprise any type of data storage system, or a combination of data storage systems, including, but not limited to, a storage area network (SAN) system, a dynamic scale-out data storage system, or other types of distributed data storage systems comprising software-defined storage, clustered or distributed virtual and/or physical infrastructure. The term "distributed data storage system" or "data storage system" as used herein should be broadly construed and not viewed as being limited to storage systems of any particular type or types. In some embodiments, the distributed storage system 130 comprises a dynamic scale-out storage system which allows additional storage nodes 132 to be added (or removed) to the cluster to scale the performance and storage capacity of the distributed storage system 130. It is to be noted that each storage node 132 (with its associated storage devices 150) is an example of what is more generally referred to herein as a "storage system" or a "storage array."

In some embodiments, the distributed storage system 130 comprises a dynamic scale-out software-defined storage system which is configured to implement a high-capacity block-level SAN storage system (e.g., virtual SAN system) that consolidates the capacity of the storage devices 150 (e.g., HDDs, SSDs, NVMe flash storage, flash PCIe cards etc.) of the storage nodes 132 into shared block storage which is logically partitioned into logical storage volumes identified by, e.g., logical unit numbers (LUNs), logical block device IDs (e.g., ISCI IDs), etc. In some embodiments, the exemplary software-defined storage system and associated components as described herein are implemented using a PowerFlex™ software-defined storage product from Dell Technologies, which implements the multi-modal write caching systems and methods as discussed herein. A PowerFlex software-defined storage system creates a server-based storage area network (SAN) from local server storage using, e.g., x86 servers, and converts direct-attached storage into shared block storage than runs over an IP-based network. In this regard, software components of a PowerFlex software-defined storage system execute on the storage nodes 132 to implement a software-defined storage environment in which the storage nodes 132 form a loosely coupled storage server cluster and collectively communicate and operate to create a server-based virtual SAN system to provide host access to a virtual pool of block storage using the combined storage capacity (e.g., storage devices 150) of the storage nodes 132. The software-defined storage system collectively implements various functions for deploying and managing a software-defined, scale-out server SAN architecture that can grow to hundreds and thousands of severs.

More specifically, in the scale-out software-define storage environment, the storage data servers 142 of the storage control systems 140 are configured to create and manage storage pools (e.g., virtual pools of block storage) by aggregating storage capacity of the respective storage devices 150 and dividing each storage pool into one or more logical volumes (e.g., persistent storage volumes 160 and ephemeral storage volumes 170). The logical volumes are exposed as block devices to storage data clients (SDCs) which reside and execute on the compute nodes 110, wherein the block devices (e.g., virtual disks) are assigned unique identifiers (e.g., SCSI IDs). For example, a block device may comprise one or more volumes of a storage pool. Each block device comprises any number of actual physical storage devices, wherein each block device is preferably homogenous in terms of the type of storage devices that make up the block device (e.g., a block device can include only HDD devices or SSD devices, etc.).

In some embodiments, each compute node 110 which runs a client application that consumes storage of the distributed storage system 130 runs an instance of the SDC component. The SDC component comprises a lightweight block device driver that exposes the logical storage volumes as block devices to the client applications that execute on the given compute node 110. During operation, the SDC component intercepts client I/O requests, and utilizes the intercepted I/O request to access the block storage managed by the storage data servers 142. In some embodiments, the SDC component is installed in the operating system or hypervisor hosting the application layer and provides the operating system or hypervisor access to the logical block devices (e.g., volumes). The SDC components have knowledge of which storage data server 142 components hold their respective block data, so multipathing can be accomplished natively through the SDC components.

The software-based data management services 146 include various software components to implement various data storage managing services including, but not limited to, inline data compression/decompression, deduplication, thin provisioning, and data protection services such as data replication (e.g., journal-based asynchronous replication), backup, snapshots, and data protection and resiliency schemes based on data striping and/or parity (e.g., erasure coding. RAID (redundant array of independent disks), etc.), and other types of data management operations, depending on the system configuration.

As noted above, the multi-modal write cache manager 144 implements methods to configure and manage multi-modal write caches for application instances (e.g., virtual machines) running on the compute nodes 110. The multi-modal write cache manager 144 configures and manages the persistent write caches 162 in the persistent storage volumes 160, and configures and manages the non-persistent write caches 172 in the ephemeral storage volumes 170, using methods as discussed herein. In some embodiments, the persistent storage volumes 160 (which comprise the persistent write caches 162) are implemented on SSD devices, e.g., provisioned IOPS SSD storage volumes.

Moreover, in some embodiments, the ephemeral (non-persistent) storage volumes 170 (which comprise the non-persistent write caches 172) are implemented on SSD devices, such as NVMe SSD devices, which are locally attached at the instance level to provide, e.g., local virtual machine memory, local disk memory, etc. When an ephemeral storage volume 170 is attached to an application instance, the throughput is not shared with other application instances, so I/O reservation (e.g., provisioned IOPS) is not necessary and I/O is not throttled (as compared to I/O provisioned persistent storage volumes where I/O workload can be throttled back to prevent from exceeding the provisioned I/O performance). In some embodiments, the use of ephemeral storage volumes stored on local NVMe SSD devices provides a higher performance storage solution for storing and accessing data, as compared to utilizing persistent storage volumes. However, the ephemeral storage volumes on the local NVMe SSD drives are not persistent and data is lost when, e.g., the application instances fail or are otherwise terminated.

In some embodiments, the compute nodes 110 and/or storage nodes 132 within the network computing environment 100 are physically partitioned/grouped in "fault domains." In general, a fault domain comprises a set of hardware components that share a single point of failure. In some embodiments, a fault domain comprises a group of storage nodes 132 that share a common power source and network switch. In some embodiments, fault domains provide a physical separation of a given customer workload over different hardware systems in a given datacenter (e.g., physical separation of power, cooling, and network hardware that supports the physical servers located in server racks) to prevent an outage in one fault domain from affecting the hardware systems in another fault domain.

In some embodiments, as explained in further detail below, the non-persistent write cache for a given application instance comprises a primary non-persistent write cache and at least one secondary non-persistent write cache, wherein the secondary non-persistent write cache is utilized to store a mirror copy (e.g., replica) of the primary non-persistent write cache. The primary non-persistent write cache is implemented in a non-persistent storage volume that is located in one fault domain, while the secondary non-persistent write cache is implemented in a non-persistent storage volume that is location in another fault domain. In this regard, physically locating the primary and secondary non-persistent write caches in different fault domains provides some level of resilience to failures (and allows continuity of operation) with the assumption that it is highly unlikely to have a concurrent failure of both fault domains resulting in the loss of the primary and secondary non-persistent write caches at the same time.

The multi-modal write cache manager 144 implements other write cache management techniques that are commonly employed to support write caching. For example, in some embodiments, the multi-modal write cache manager 144 is configured to maintain a write cache lookup metadata structure in primary memory (e.g., RAM) which enables random access to the content of the write cache. The write cache lookup metadata structure is utilized to serve I/O read requests for data that is contained in the write caches, before the cached data is destaged from the write cache and persistently stored in primary storage. In some embodiments, the multi-modal write cache manager 144 implements write cache structures that are configured to store data items (e.g., I/O write data) together with associated metadata items in the write caches, which reduces the overhead for handling write data and associated metadata since the write data and associated metadata is initially persisted in the write caches without the need for extra I/O to store the metadata items separately from the data items. In this regard, specific entries in a given write cache may be only metadata, such as a deletion (unmap) command or a command to create deduplication, etc. In addition, the multi-modal write cache manager 144 implements cache destage methods to perform write cache eviction/destaging operations which take into consideration that the write caches comprise both data items and associated metadata items, which are separate entities that are persisted in different primary data structures.

As noted above, in some embodiments, the network computing environment 100 of FIG. 1 illustrates an exemplary architecture of a public cloud-based computing platform (e.g., AWS, Microsoft Azure, Google Cloud) to provide cloud computing services to customers. For illustrative purposes, exemplary techniques for multi-modal write caching using persistent storage volumes and non-persistent storage volumes may be discussed in the context of the AWS public cloud platform, which currently offers a PowerFlex software-defined storage system to customers as part of the storage service offerings of the AWS public cloud platform. It is to be understood however, that the exemplary multi-modal write caching techniques discussed herein can be implemented by other public cloud platforms which offer and provide both persistent and non-persistent (ephemeral) storage services for storing and managing customer data.

By way of example, AWS currently offers an Elastic Compute Cloud (EC2) service (under an IaaS), which provides web services related to computing, storage, and networking, for rent. For example, the EC2 service provides EC2 instances which are essentially virtual servers or virtual machines that a customer can utilize to provision one or more compute servers (e.g., compute node 110) to deploy and execute the customer's applications. The EC2 instances provide virtual computing environments which can be configured with CPU, memory, storage, and networking capacity, as needed for a given application. The customer can attach persistent storage volumes and/or non-persistent (ephemeral) storage volumes to the EC2 instances.

For example, EC2 instances can utilize a type of ephemeral storage referred to as AWS "instance store," which provides non-persistent (ephemeral) storage volumes referred to as "instance store volumes." The instance store volumes provide temporary block-level storage for data associated with EC2 instances, and can be used to store temporary data that is replicated across multiple instances on different server nodes for purposes of, e.g., load balancing, etc. An instance store can include one or more instance store volumes (non-persistent storage volumes) that are exposed as block devices, and utilized by EC2 instances to store data on a temporary basis such that when a given EC2 instance is deleted, temporarily stopped, etc., the data in the instance store volumes attached to the given instance is deleted. The EC2 instance store volumes (non-persistent storage volumes) can be implemented using SSD devices (e.g., NVMe or SATA-based SSD devices) or SATA-based HDD devices. As noted above, in some embodiments, the non-persistent write caches 172 of a multi-modal cache system are implemented in SSD-based non-persistent storage volumes to enable high random I/O performance with very low latency. The instance store volumes are essentially part of the EC2 service and are included as part of the usage cost of the EC2 instances.

In addition, EC2 instances can utilize a type of persistent storage service provided by AWS, which is referred to as Elastic Block Store (EBS). The EBS storage service provides various types/classes of EBS persistent storage volumes with different performance and pricing. The EBS volumes include SSD-based volumes or HDD-based volumes. The SSD-based volumes include, for example, general purpose SSD (gp2) volumes, next generation general purpose SSD (gp3) volumes, and provisioned IOPS SSD (io1 and io2) volumes. The next-generation general purpose SSD (gp3) volumes, and provisioned IOPS SSD (io1 and io2) volumes for EBS enable customers to provision performance independent of storage capacity, e.g., customers can scale IOPS and throughput (providing reserved throughput I/O) without having to provision additional block storage capacity, and pay only for the resources they need. The provisioned IOPS volumes backed by SSD devices provide high-performance persistent storage volumes that are designed for critical, IOPS-intensive and throughput-intensive workloads that require low latency. On the other hand, with the general purpose SSD (gp2) volumes, performance is tied to storage capacity, where the customer can obtain higher IOPS and throughput for their applications by provisioning a larger storage volume size.

As noted above, in some embodiments, the persistent write caches 162 of a multi-modal cache system are implemented using provisioned IOPS SSD-based persistent storage volumes (EBS volumes) for high I/O performance, low latency write caching. Moreover, the EBS storage services include replication services wherein the EBS persistent storage volumes are automatically replicated within an availability zone, which provides resiliency to protect against failures. In some embodiments, the persistent write cache is protected using a RAID scheme, e.g., RAID 6. In this regard, the EBS storage volumes are both persistent and protected storage volumes.

Furthermore, AWS offers a storage service referred to as Simple Storage Service (S3). S3 provides an object storage service that allows a user to store and retrieve data in files that are addressed as objects. The S3 object storage service offers a low-cost durable storage solution (e.g., cost-effective storage classes), which provides scalability, data availability, security, and performance.

In addition, AWS (and other public cloud vendors) provide multiple physical locations for resources (e.g., instances and storage volumes) referred to as "regions" and "availability zones" (AZ), etc. In the context of public cloud services, availability zones are similar to fault domains in that, generally speaking, availability zones provide isolation boundaries for computing and storage resources, wherein if one availability zone goes down, the others continue working. In some embodiments, availability zones are utilized to provide resiliency for non-persistent write caches in a similar manner as fault domains as discussed above, wherein a primary non-persistent write cache is implemented in a non-persistent storage volume that is located in one availability zone, while secondary non-persistent write cache (which comprises a mirror/replica copy of the primary non-persistent write cache) is implemented in a non-persistent storage volume that is located in another availability zone. In this regard, physically locating the primary and secondary non-persistent write caches in different availability zones provides some level of resilience to failures (and allow continuity of operation) with the assumption that it is highly unlikely to have a concurrent failure of both availability zones potentially resulting in the loss of the primary and secondary non-persistent write caches at the same time.

Figure 2:
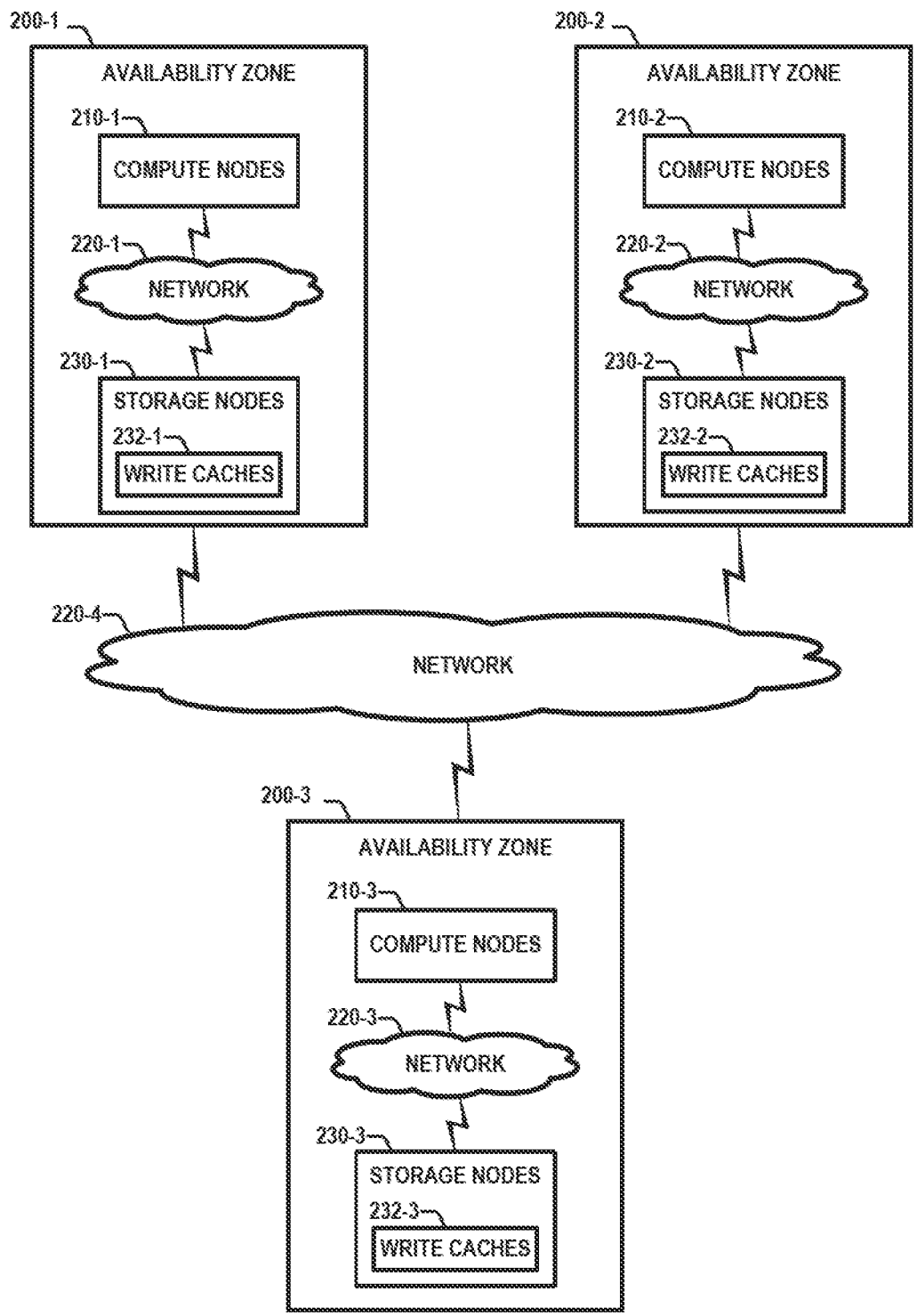
FIG. 2 schematically illustrates a network computing environment which comprises a storage system that is configured to perform multi-modal write caching, according to another exemplary embodiment of the disclosure.

For example, FIG. 2 schematically illustrates a network computing environment which comprises a storage system which implements multi-modal write caching, according to another exemplary embodiment of the disclosure. In particular, FIG. 2 schematically illustrates a network computing environment 200 comprising computing and storage resources that are separated into a plurality of availability zones 200-1, 200-2, and 200-3. Each availability zone 200-1, 200-2, and 200-3 comprises respective compute nodes 210-1, 210-2, and 210-3, respective networks 220-1, 220-2, and 220-3, and respective storage nodes 230-1, 230-2, and 230-3 which implement a distributed storage system within and across the availability zones 200-1, 200-2, and 200-3. The storage nodes 230-1, 230-2, and 230-3 comprise respective storage devices which are logically configured to include persistent storage volumes and non-persistent storage volumes that include respective write caches 232-1, 232-2, and 232-3. The availability zones 200-1, 200-2, and 200-3 are connected via a network 220-4.

Currently, as noted above, public cloud vendors such as AWS, Microsoft Azure, and Google Cloud house computing and storage resources in highly available data center facilities that are located in different physical locations that are categorized by "availability zones" and "regions" to provide scalability and reliability. The availability zones comprise isolated data centers located within specific regions in which public cloud services originate and operate. An availability zone may comprise, for example, one or more data centers, wherein each data center is equipped with independent power, cooling and networking infrastructure all housed in separate facilities. The availability zones within a given region are typically connected to each other through very fast, private fiber-optic networks, and allow customers to run mission-critical applications with high availability and low-latency replication. A region is a geographical location having multiple availability zones mapped within it. Each region can have any number of availability zones, and each region is isolated and independent from every other region such that the availability zones are not shared between different regions. Regions are distributed over the world which allows cloud providers to service customers on multiple continents.

FIG. 2 illustrates an exemplary embodiment showing a single region comprising three availability zones 200-1, 200-2, and 200-3, although the region can include any number of two or more availability zones. The availability zones 200-1, 200-2, and 200-3 are independent such that a failure or outage within a given one of the availability zones 200-1, 200-2, and 200-3 will not affect the other availability zones. The availability zones 200-1, 200-2, and 200-3 are distinct locations within a given region that are specifically engineered to be isolated from failures in other availability zones. The network 220-4 is configured to provide low-latency network connectivity between the availability zones 200-1, 200-2, and 200-3 within the same region. A region can have multiple availability zones, but no availability zones are shared with different regions.

A cloud user (e.g., business enterprise) can utilize nodes (e.g., compute and/or storage nodes) in different availability zones to achieve fault tolerance, wherein the cloud user workload can be distributed across two more different availability zones within a given region. A cloud user can replicate services across multiple availability zones to decrease latency and/or protect resources (e.g., resources can be moved to another availability zone in the event of an outage). The cloud user can distribute instances (e.g., applications, virtual machines, EC2 instances, etc. running on the compute nodes) across multiple availability zones to provide redundancy and failover in the event that a given data center in an availability zone encounters a problem.

To further optimize multi-modal cache writing performance and to minimize the financial costs associated with the multi-modal cache writing, for a given multi-modal write cache associated with a client application, a given availability zone (or fault domain) is deemed either a primary AZ (or primary fault domain) or a secondary AZ (or secondary fault domain). For a given client application, the associated primary storage, primary non-persistent write cache, and persistent write cache(s) are located in a primary AZ, while a secondary AZ (or secondary fault domain) only hosts the secondary non-persistent write cache which comprises the mirror/replica copy of the primary non-persistent write cache. In other words, the secondary non-persistent write cache copies reside in non-persistent storage volumes that are dedicated for keeping and recovering the write cache, but the write processing will take place only using the primary copy. In practice, EBS-based write cache may also have primary and secondary copies, but all of which will reside on the primary AZ.

Figure 3:
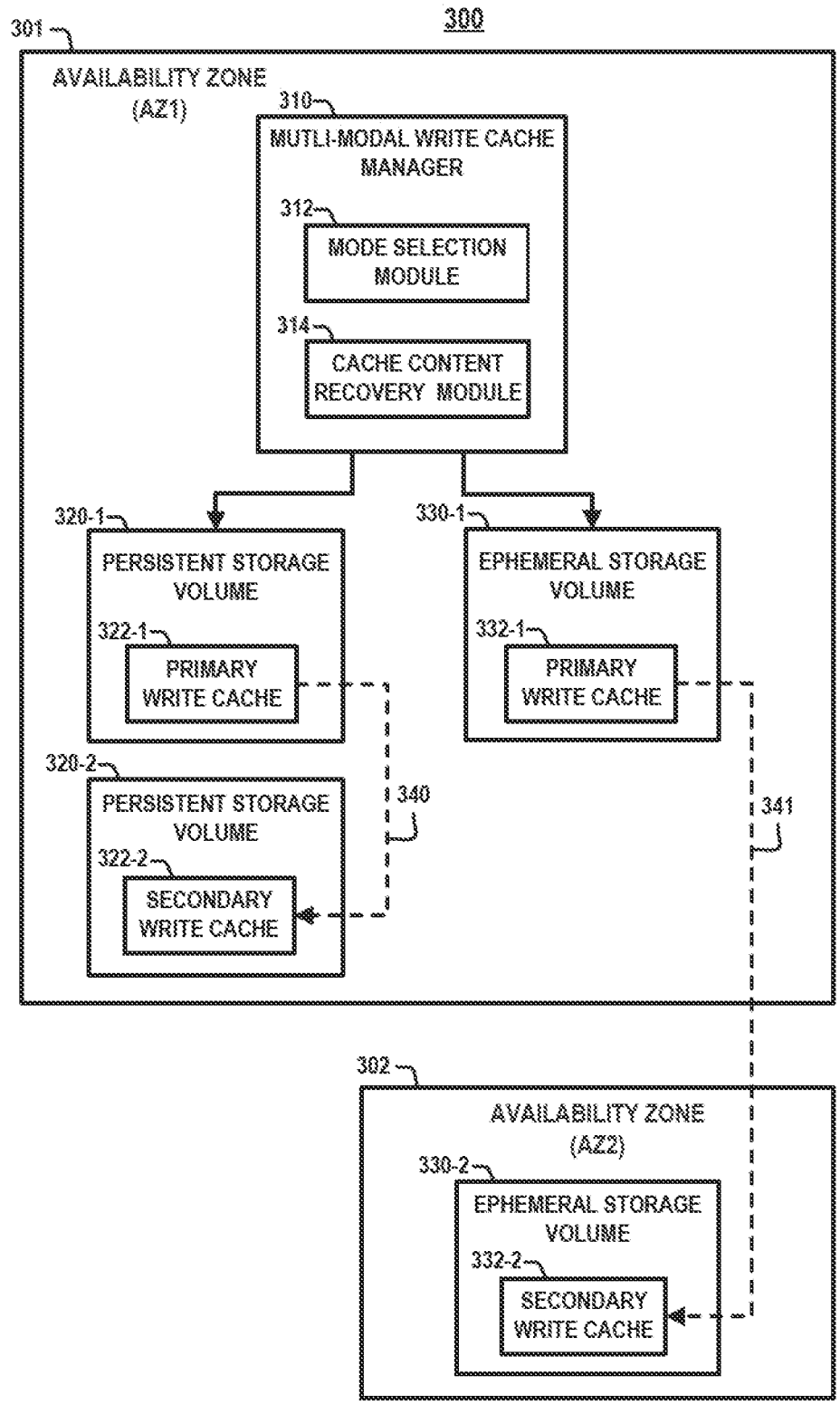
FIG. 3 schematically illustrates a multi-modal write cache system, according to an exemplary embodiment of the disclosure.

For example, FIG. 3 schematically illustrates a multi-modal write cache system, according to an exemplary embodiment of the disclosure. In particular, FIG. 3 schematically illustrates a multi-modal write cache system 300 which supports a cross-AZ write cache mode of operation. For case of illustration and explanation, FIG. 3 depicts a first availability zone 301 (or AZ1) and a second availability zone 302 (or AZ2). The first availability zone 301 comprises A multi-modal write cache manager 310 which is assumed to operate on a given storage node in the first availability zone 301. As noted above, the multi-modal write cache manager 310 is a software module which comprises various components including, but not limited to, a mode selection module 312 and a cache content recovery module 314, which implement methods to support multi-modal write caching systems and methods as discussed herein.

The first availability zone 301 comprises a first persistent storage volume 320-1 which comprises a primary write cache 322-1, a second persistent storage volume 320-2 which comprises a secondary write cache 322-2, and first ephemeral storage volume 330-1 (non-persistent storage volume) which comprises a primary write cache 332-1. The second availability zone 302 comprises a second ephemeral storage volume 330-2 (non-persistent storage volume) which comprises a secondary write cache 332-2. The primary write cache 322-1 and the secondary write cache 322-2 comprise persistent write caches that reside on different storage nodes within the first availability zone 301. The primary write cache 332-1 and the secondary write cache 332-2 comprise non-persistent write caches that reside on storage nodes with the separate first and second availability zones 301 the 302.

As noted above, the multi-modal write cache system 300 comprises a hybrid solution implemented using persistent write caches and non-persistent write caches, wherein the persistent write caches (e.g., primary and secondary write caches 322-1 and 322-2) are implemented in persistent storage volumes (e.g., first and second persistent storage volumes 320-1 and 320-2) on different storage nodes within the same fault domain (e.g., first availability zone 301), and wherein the non-persistent write caches (e.g., primary and second write caches 332-1 and 332-2) are implemented in non-persistent storage volumes (e.g., first and second ephemeral storage volumes 330-1 and 330-2) on respective storage nodes in different fault domains (e.g., first and second availability zones 301 and 302).

The persistent write caches (e.g., primary and secondary write caches 322-1 and 322-2) in the persistent storage volumes (e.g., first and second persistent storage volumes 320-1 and 320-1) are utilized to cache I/O write data for a base I/O workload to thereby achieve low-latency write acknowledgments to hosts, while avoiding cross-AZ traffic costs. On the other hand, the non-persistent write caches (e.g., primary and secondary write caches 332-1 and 332-2) in the non-persistent storage volumes (e.g., first and second ephemeral storage volumes 330-1 and 330-2) are utilized to cache I/O write data for an I/O workload that exceeds a provisioned I/O performance metric, which would result in additional costs to the cloud user for using the non-persistent storage volumes for write caching and storing data.

In the exemplary embodiment shown in FIG. 3, for each incoming I/O write, the mode selection module 312 will decide which write cache mode to utilize (e.g., persistent write caching or non-persistent cross-AZ write caching) for the incoming I/O write. The factors and considerations that are utilized for determining which of the two write-cache modes to use at a given time may depend on the specifics of the cloud vendor and the options provided by the cloud vendor. However, a fundamental idea is to utilize persistent write caches in persistent storage volumes (e.g., protected volumes such as EBS) to satisfy the base I/O write workload, while using non-persistent write caches in non-persistent storage volumes (e.g., ephemeral storage (e.g., instance store volumes) for EC2 instances) across separate availability zones to satisfy write cache for bursting.

To further optimize the cost, as schematically illustrated in FIG. 3, the persistent and non-persistent primary write caches 322-1 and 332-1 are deployed in the same availability zone 301 (referred to as a "primary availability zone") where the primary storage is deployed. This allows the write cache data to be destaged from either the persistent and non-persistent primary write caches 322-1 and 332-1, and store to the primary storage within the same availability zone under normal operating conditions, and avoid the costs associated with cross-AZ traffic. On the other, the second availability zone 302 (referred to as "secondary availability zone") is utilized to host a backup copy of the non-persistent primary cached data in the non-persistent secondary write cache 332-2.

The I/O write caching is performed using the persistent primary write cache 322-1 and the non-persistent primary write cache 332-1, wherein writes are acknowledged after writing the I/O write data to one of the primary write caches 322-1 or 332-1. The secondary write caches 322-2 and 332-2 are dedicated to maintaining copies of the primary write caches 322-1 and 332-1, and for recovering the write cache, when needed, by recovery operations that are performed by the cache content recovery module 314. As schematically illustrated by the dashed line arrows 340 and 341 in FIG. 3, when data is written to the persistent primary write cache 322-1, a data replica/mirror operation is performed to write a copy of the newly cached data to at least the persistent secondary write cache 322-2 on a different storage node within the first (primary) availability zone 301. In practice, an EBS-based persistent write cache may have primary and secondary cache copies, but all of which will reside on the primary AZ. Further, when data is written to the non-persistent primary write cache 332-1, a data replica/mirror operation is performed to write a copy of the newly cached data to the non-persistent secondary write cache 332-2 on a storage node within the second (secondary) availability zone 302. Similarly, when data is destaged from the primary write caches 322-1 and 332-1, the secondary write caches 322-2 and 332-2 are updated to delete the corresponding copy of the destaged data in the secondary write caches 322-2 and 332-2. Exemplary methods for performing multi-modal write caching will be discussed in further detail in conjunction with FIGS. 4 and 5.

Figure 4:
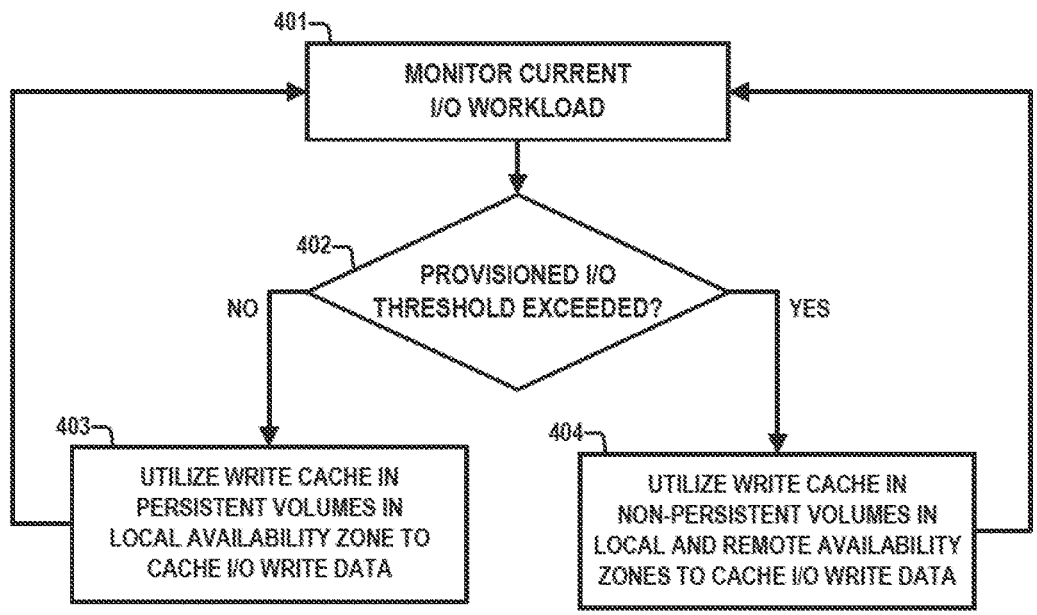
FIG. 4 is a flow diagram which illustrates a method for performing multi-modal write caching, according to an exemplary embodiment of the disclosure.

For example, FIG. 4 is a flow diagram which illustrates a method 400 for performing multi-modal write caching, according to an exemplary embodiment of the disclosure. In some embodiments, FIG. 4 illustrates a multi-modal write caching method that is performed by a storage control system, wherein the method comprises receiving an I/O write request from a client application to write data to a primary storage volume, comparing a current I/O workload associated with the client application to an I/O workload threshold, and writing the data of the I/O write request to one of (i) a persistent write cache in a persistent storage volume and (ii) a non-persistent write cache in a non-persistent storage volume, based at least in part on a result of comparing the current I/O workload to the I/O workload threshold.

In some embodiments, FIG. 4 illustrates an exemplary mode of operation of a multi-modal write cache manager, e.g., the multi-modal write cache manager 144 (FIG. 1), and the multi-modal write cache manager 310 (FIG. 3). As noted above, the persistent storage volumes, which are used to implement persistent write caches, are typically backed by SSD storage volumes with a provisioned I/O performance (e.g., provisioned IOPS). The multi-modal write cache manager performs multi-modal write caching by monitoring or otherwise tracking a current I/O workload associated with one or more client application instance(s) (e.g., active virtual machine instances, container applications, etc.) of a given customer (block 401). In this instance, it is assumed that the given customer has created a persistent storage volume with a provisioned storage performance threshold (e.g., IOPS), for storing application data.

In some embodiments, the multi-modal write cache manager can be configured to compute or otherwise determine a current I/O workload as needed to perform multi-modal write caching. In other embodiments, the multi-modal write cache manager utilizes I/O workload information which is monitored/tracked by another component of the storage system and provided to multi-modal write cache manager to perform the multi-modal write cache operations. In some embodiments, the I/O workload information comprises one or more storage performance metrics such as, e.g., IOPS, I/O throughput, write throughput, etc., which allows the multi-modal write cache manager to compare the current I/O workload (which is associated with the client application instance(s) of the given customer) to a provisioned I/O performance threshold to determine whether the current I/O workload has exceeded the provisioned I/O performance threshold for the persistent (protected) storage volume that is configured to store the application data (block 402).

If the multi-modal write cache manager determines that the current I/O workload does not exceed the provisioned I/O performance threshold for the persistent storage volume (negative determination in block 402), the multi-modal write cache manager will utilize a persistent write cache (e.g., primary persistent write cache) in the persistent storage volume in a local (primary) available zone to cache the I/O write data (block 403). In this instance, a write acknowledgment is sent to the client application once the I/O write data is successfully written to the primary persistent write cache. Further, depending on the system configuration, the cached I/O data is copied to at least one additional (secondary) persistent write cache using data mirroring or replication operations, or the persistent write cache is protected using RAID, e.g., RAID 6. In some embodiments, the cloud provider (e.g., AWS) will automatically perform the data replication/mirroring or RAID processing of the persistent storage volumes according to the given storage service, e.g., EBS, provided to the customer. As noted above, in some embodiments, the secondary persistent write cache is configured in a persistent storage volume on a separate storage node within the primary availability zone.

On the other hand, if the multi-modal write cache manager determines that the current I/O workload does exceed the provisioned I/O performance threshold for the persistent storage volume (affirmative determination in block 402), the multi-modal write cache manager will utilize a non-persistent write cache (e.g., non-persistent primary write cache) in a non-persistent storage volume in the local (primary) availability zone to cache the I/O write data (block 404). In this instance, a write acknowledgment is sent to the client application once the I/O write data is successfully written to the non-persistent write cache in the primary availability zone. Further, the cached I/O data is copied to at least one additional (secondary) non-persistent write cache using data mirroring or replication operations. As noted above, the secondary non-persistent write cache is configured in a non-persistent storage volume on a separate storage node within a remote (secondary) availability zone.

Figure 5:
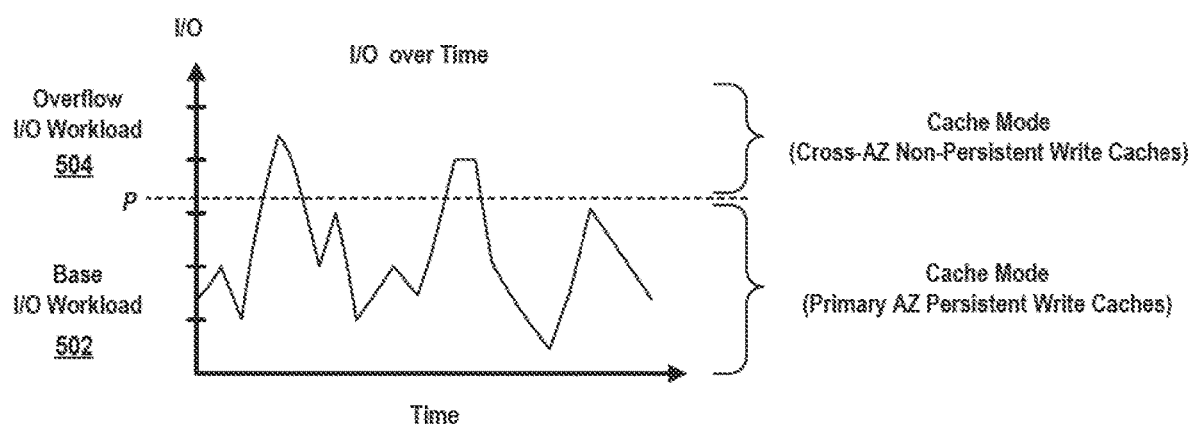
FIG. 5 schematically illustrates a method for performing multi-modal write caching, according to an exemplary embodiment of the disclosure.

FIG. 5 schematically illustrates a method for performing multi-modal write caching, according to an exemplary embodiment of the disclosure. In particular, FIG. 5 illustrates a graph 500 which plots an exemplary I/O workload (y-axis) which is tracked over time (x-axis) to implement multi-modal write cache operations. The I/O workload can be any suitable I/O storage performance metric such as IOPS, throughput, etc. FIG. 5 shows a provisioned I/O performance threshold (denoted P) wherein the I/O workload below the provisioned I/O performance threshold P is deemed a base I/O workload 502, and wherein the I/O workload above the provisioned I/O performance threshold P is deemed an overflow I/O workload 504. The overflow I/O workload 504 represents periods of time of I/O bursts which exceed the provisioned I/O performance threshold P.

For the multi-modal write caching, the I/O write requests that are included in the base I/O workload 502 are handled using the persistent cache mode (first cache mode) in which the I/O write data is written to a persistent write cache in a persistent storage volume in the primary availability zone, while the I/O write requests that are included in the overflow I/O workload 504 are handled using the non-persistent cache mode (second cache mode) in which the I/O write data is written to a non-persistent primary write cache in a non-persistent storage volume in the primary (local) availability zone, and copied to a non-persistent secondary write cache in a non-persistent storage volume in a secondary (remote) availability zone.

With the exemplary multi-mode write caching architecture as shown in FIG. 5, no additional financial cost is associated with utilizing the persistent storage volume (with the provisioned I/O performance threshold P) to configure and utilize persistent write caches to cache the I/O write data for the base I/O workload 502, as long as the I/O workload does not exceed the provisioned I/O performance threshold P. On the other hand, when the I/O workload exceeds the provisioned I/O performance threshold P, the I/O write data associated with the overflow I/O workload 504 is write cached using the non-persistent cache mode of operation in which the non-persistent write caches in the non-persistent storage volumes (e.g., ephemeral storage volumes), which are attached to the application instances, are used to cache the I/O write data for the overflow I/O workload 504.

As noted above, the ephemeral storage volumes that are attached to application instances are typically a non-billable resource that is included in the cost of the applicant instance. As such, there is no additional cost associated with utilizing the non-persistent storage volumes for handling the write caching for the overflow I/O workload 504, other than the cost of transmitting copies of the I/O write cached data from the primary availability zone to a non-persistent volume in the secondary availability zone. In this instance, the additional charge can be based on the number bytes that are transmitted cross-AZ, where a customer will only be charged extra for write caching of the I/O write data for the overflow I/O workload 504.

As noted above, the cache content recovery module 314 (FIG. 3) is configured to implement methods for recovering a write cache in the event of some failure. For example, in some embodiments, the cache content recovery module 314 implements methods for write cache recovery in response to failures of non-persistent write caches in the primary or secondary availability zone. In some embodiments, the cache content recovery module 314 is configured to handle different categories of failures depending on whether a given failure is "partial failure" or a "full failure." The term "partial failure" as used herein generally denotes a failure condition in which some instances are lost, but the primary and secondary availability zones as a whole are still functional and operating. As noted above, non-persistent storage (ephemeral storage) is the volatile temporary storage that is attached to application instances (e.g., virtual machines). In situations where the application is stopped or terminated or underlying hardware faces an issue, any data (e.g., write cache data) stored on the ephemeral storage volume would be lost. The term "full failure" as used herein generally denotes a failure condition in which an entire availability zone is down. The term "primary failure" as used herein denotes a failure condition in which failed instances are on a primary availability zone. The term "secondary failure" as used herein denotes a failure condition in which failed instances are on a secondary availability zone.

Figure 6:
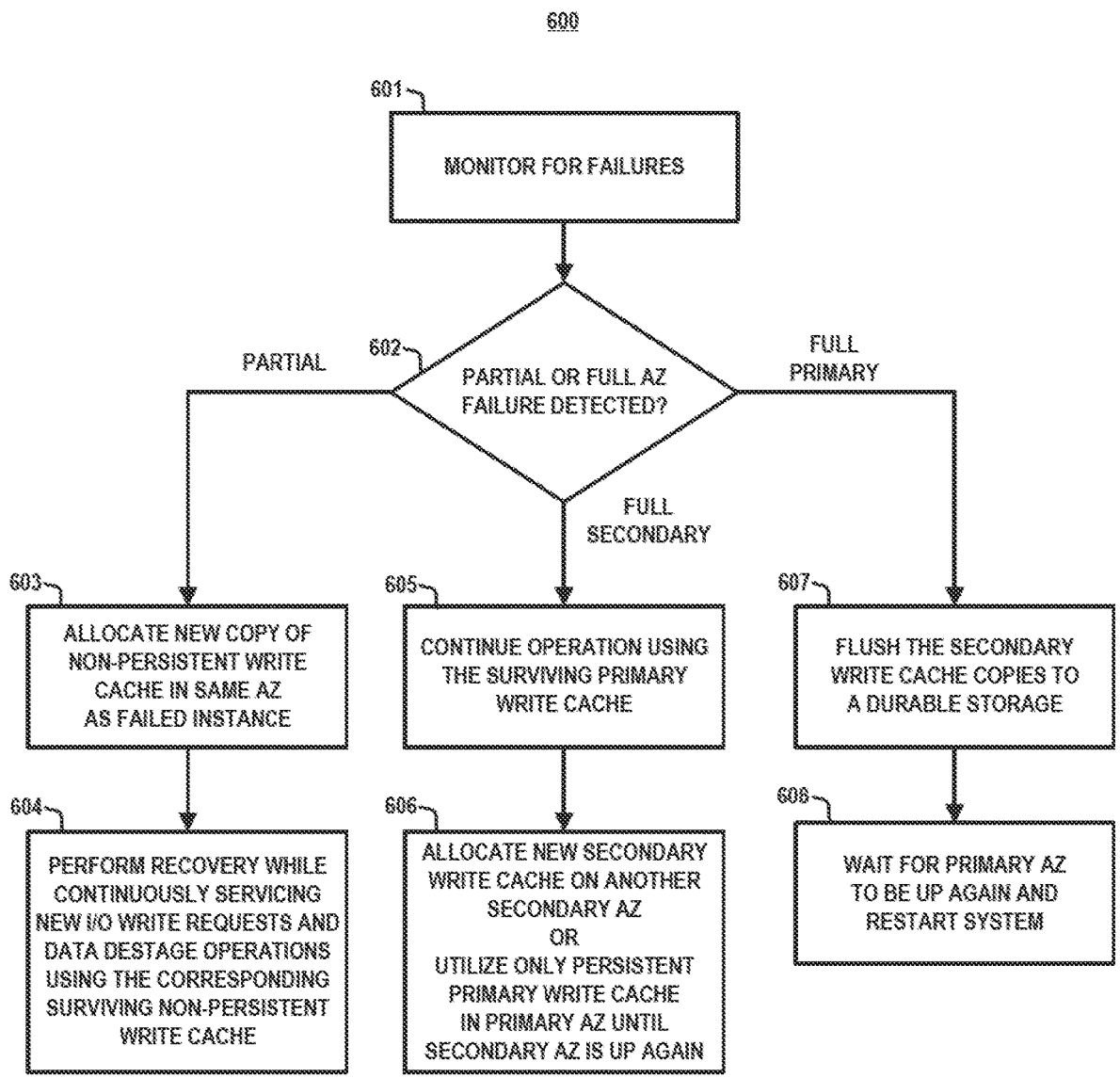
FIG. 6 is a flow diagram which illustrates methods for recovering non-persistent write caches in response to various failure conditions, according to exemplary embodiments of the disclosure.

FIG. 6 is a flow diagram which illustrates methods for recovering write caches in response to various failure conditions, according to exemplary embodiments of the disclosure. In some embodiments, FIG. 6 illustrates exemplary modes of operation of the multi-modal write cache manager 144 (FIG. 1), and the multi-modal write cache manager 310 (FIG. 3). The multi-modal write cache manager monitors for the occurrence of a failure condition that requires write cache recovery (block 601). In response to detecting the occurrence of a failure condition, the multi-modal write cache manager will determine the nature of the failure condition (block 602). For example, the multi-modal write cache manager will determine if the failure condition comprises one of, e.g., a partial failure or full failure in a given availability zone having a non-persistent write cache that is managed by the multi-modal write cache manager, and whether the partial or full failure comprises a primary failure or secondary failure.

In response to determining (in block 602) that the failure condition is a partial failure of a primary availability zone (primary failure) or a secondary availability zone (secondary failure), the multi-modal write cache manager will proceed to allocate a new write cache copy for a given failed instance in a non-persistent storage volume on the same availability zone (primary or secondary) as the given failed instance (block 603). The multi-modal write cache manager performs a data recovery operation by populating the newly allocated write cache with a copy of the cached data in the corresponding surviving non-persistent write cache, while continuously serving incoming I/O writes and data destage operations using the corresponding surviving non-persistent write cache (block 604).

In response to determining (in block 602) that the failure condition is a full failure of a secondary availability zone (referred to as full secondary failure), the multi-modal write cache manager will proceed to perform I/O write caching and data destaging operations using the surviving non-persistent primary write cache (block 605). Next, in some embodiments, the multi-modal write cache manager will allocate a new secondary write cache in a non-persistent storage volume on another secondary availability zone, if available, and populate the new secondary write cache with a copy of the cached data in the surviving non-persistent primary write cache (block 606). Alternatively, if no other secondary availability zone is available, the multi-modal write cache manager can perform write caching operations using only the persistent write cache in the primary availability zone and wait until the secondary availability zone is up and running again (block 606). Further, in some embodiments, the multi-modal write cache manager can proceed to automatically increase the I/O performance provisioning of the persistent storage volume on the primary availability zone to handle I/O bursts for the duration of the secondary availability zone failure. In some embodiments, the change in the performance provisioning is not instantaneous, but considering the low likelihood of AZ failure, and the long time it may take to resolve the AZ failure, this approach may fit many use cases.

In response to determining (in block 602) that the failure condition is a full failure of a primary availability zone (referred to as full primary failure), the multi-modal write cache manager will proceed to flush the copies of the secondary write caches to a durable storage (e.g., S3 storage of AWS) for extra protection (block 607), and then wait for the primary availability zone to be up and running, and then restart the system (block 608).

For the exemplary multi-mode write caching systems and methods as discussed herein, various recovery methods can be utilized to process and recover a write cache in case of a failure. In some embodiments, as noted above, an index metadata structure is maintained in RAM to enable random access lookup of the cached data items in a write cache so that the write cache can be utilized to serve read requests for accessing cached data items, before such data items are written to primary storage and destaged from the write cache. In the event of a failure, in some embodiments, the cache index metadata structure in RAM is recovered as-is by means of vaulting. For example, a vaulting RAM system may comprise a battery-backed RAM in which data is stored to vault devices upon device or power failure. For example, the metadata indexing structure in RAM can be protected against sudden power loss or hardware failure by means of a power-fail memory persistent feature which automatically stores the RAM indexing metadata structure in local and remote nodes of a node pair using a destaging process known as vaulting. During vaulting, a dedicated battery in each node protects the indexing metadata structure until it has been safely written on both nodes of a node pair. With vaulting, there is no issue with regard to recovery of write cache data.

On the other hand, in embodiments where no vaulting is implemented, in the event of a failure, the write cache can be replayed, starting from a point-in-time where the changes have not been persisted and are lacking in the system, up to the point of failure. This involves performing a process of rescanning the content of the write cache to recreate the RAM indexing metadata structures, wherein the scan is performed in an order in which the write cache content was created. In such an implementation, the recovery process must scan both the persistent and non-persistent write caches in a proper order. The order of recovery must be the same as the order of acknowledgments to the suer.

In some embodiments, to determine the proper ordering, a unique sequence number is utilized to label every write to the persistent and non-persistent write caches, wherein the persistent and non-persistent write caches both share the same sequence numbering. By way of example, a sequence of cache entries with sequence numbers 1-1000 may be written to the persistent and non-persistent write caches such that (i) the cache entries with sequence numbers 1-450 are written to the persistent write cache, (ii) the cache entries with sequence numbers 451-900 are written to the non-persistent write cache, and (iii) the cache entries with sequence numbers 901-1000 are written to the persistent write cache, and so on. Each time a record is written to either one of the persistent cache or the non-persistent write cache, the shared number sequence is incremented and is written as part of the record. Writes to both write caches may be concurrent and the write with the higher sequence number may return before the write with the lower sequence number. When writing to the write caches, the acknowledgements to the user are sent in the same order as the sequence number. When this happens, the write cache processes an acknowledgment to the user with the higher sequence record and waits for the lower sequence record to complete. This mechanism provides a globally defined order for all cache entries in both instances. When recovering from the write cache, both instances are read in parallel. The record with the lower sequence of the two is the one that is processed first. This behavior is similar to a merge operation. The recovery process involves reading the write cache, parsing it, and replaying the items one at a time to reconstruct the lost RAM metadata. Metadata requires structure, so for recovery, the metadata must be rebuilt such that the recovery of metadata comes at a cost.

Figure 7:
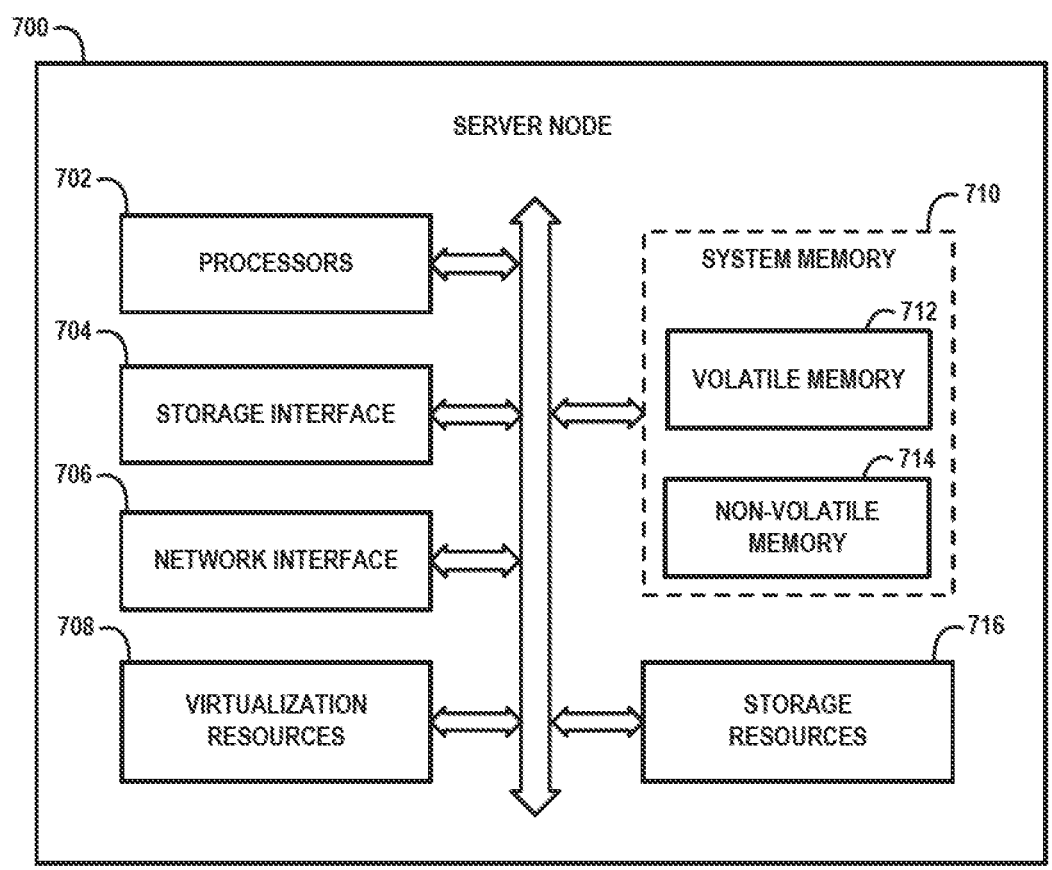
FIG. 7 schematically illustrates a framework of server node for hosting software components of storage system which is configured to perform multi-modal write caching, according to an exemplary embodiment of the disclosure.

FIG. 7 schematically illustrates a framework of a server node for hosting software components of scale out software-defined storage system which is configured to perform multi-modal write caching, according to an exemplary embodiment of the disclosure. For example, FIG. 7 schematically illustrates an exemplary hardware/software configuration of, e.g., the storage nodes shown in FIG. 1. The server node 700 comprises processors 702, storage interface circuitry 704, network interface circuitry 706, virtualization resources 708, system memory 710, and storage resources 716. The system memory 710 comprises volatile memory 712 and non-volatile memory 714. The processors 702 comprise one or more types of hardware processors that are configured to process program instructions and data to execute a native operating system (OS) and applications that run on the server node 700.

For example, the processors 702 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligence (AI) accelerators, and other types of specialized processors or coprocessors that are configured to execute one or more fixed functions.

The storage interface circuitry 704 enables the processors 702 to interface and communicate with the system memory 710, the storage resources 716, and other local storage and off-infrastructure storage media, using one or more standard communication and/or storage control protocols to read data from or write data to volatile and non-volatile memory/ storage devices. Such protocols include, but are not limited to, NVMe, PCIe, PATA, SATA, SAS, Fibre Channel, etc. The network interface circuitry 706 enables the server node 700 to interface and communicate with a network and other system components. The network interface circuitry 706 comprises network controllers such as network cards and resources (e.g., network interface controllers (NICs) (e.g., SmartNICs, RDMA-enabled NICs), Host Bus Adapter (HBA) cards, Host Channel Adapter (HCA) cards, I/O adaptors, converged Ethernet adaptors, etc.) to support communication protocols and interfaces including, but not limited to, PCIe, DMA and RDMA data transfer protocols, etc.

The virtualization resources 708 can be instantiated to execute one or more services or functions which are hosted by the server node 700. For example, the virtualization resources 708 can be configured to implement the various modules and functionalities as discussed herein. In some embodiment, the virtualization resources 708 comprise virtual machines that are implemented using a hypervisor platform which executes on the server node 700, wherein one or more virtual machines can be instantiated to execute functions of the server node 700. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the server node 700, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. The underlying physical infrastructure may comprise one or more commercially available distributed processing platforms which are suitable for the target application.

In another embodiment, the virtualization resources 708 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the server node 700 as well execute one or more of the various modules and functionalities of a storage system as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

In some embodiments, the constituent software components of a software-defined storage system as described, as well as the exemplary storage system shutdown and startup processes as described herein, are implemented using program code that is loaded into the system memory 710 (e.g., volatile memory 712), and executed by the processors 702 to perform respective functions as described herein. In this regard, the system memory 710, the storage resources 716, and other memory or storage resources as described herein, which have program code and data tangibly embodied thereon, are examples of what is more generally referred to herein as "processor-readable storage media" that store executable program code of one or more software programs. Computer program products which comprise a non-transitory processor-readable storage medium having stored therein program code of one or more software programs are considered embodiments of the disclosure. A processor-readable storage medium may comprise, for example, a storage device such as a storage disk, a storage array or an integrated circuit containing memory. The term "processor-readable storage medium" as used herein should be understood to exclude transitory, propagating signals.

The system memory 710 comprises various types of memory such as volatile RAM, NVRAM, or other types of memory, in any combination. The volatile memory 712 may be a dynamic random-access memory (DRAM) (e.g., DRAM DIMM (Dual In-line Memory Module), or other forms of volatile RAM. The non-volatile memory 714 may comprise one or more of NAND Flash storage devices, SSD devices, or other types of next generation non-volatile memory (NGNVM) devices. The system memory 710 can be implemented using a hierarchical memory tier structure wherein the volatile memory 712 is configured as the highest-level memory tier, and the non-volatile memory 714 (and other additional non-volatile memory devices which comprise storage-class memory) is configured as a lower level memory tier which is utilized as a high-speed load/store non-volatile memory device on a processor memory bus (i.e., data is accessed with loads and stores, instead of with I/O reads and writes). The term "memory" or "system memory" as used herein refers to volatile and/or non-volatile memory which is utilized to store application program instructions that are read and processed by the processors 702 to execute a native operating system and one or more applications or processes hosted by the server node 700, and to temporarily store data that is utilized and/or generated by the native OS and application programs and processes running on the server node 700. The storage resources 716 can include one or more HDDs, SSD storage devices, etc.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. A method, comprising:
receiving, by a storage control system, an input/output (I/O) write request from a client application to write data to a primary storage volume;
comparing, by the storage control system, a current I/O workload associated with the client application to an I/O workload threshold; and
writing, by the storage control system, the data of the I/O write request to one of (i) a persistent write cache in a persistent storage volume and (ii) a non-persistent write cache in a non-persistent storage volume, based at least in part on a result of comparing the current I/O workload to the I/O workload threshold.

2. The method of claim 1, wherein:
comparing the current I/O workload associated with the client application to the I/O workload threshold comprises determining whether the current I/O workload associated with the client application exceeds the I/O workload threshold;

in response to determining that the current I/O workload does not exceed the I/O workload threshold, the data of the I/O write request is written to the persistent write cache in the persistent storage volume; and in response to determining that the current I/O workload does exceed the I/O workload threshold, the data of the I/O write request is written to the non-persistent write cache in the non-persistent storage volume.

3. The method of claim 1, wherein the I/O workload threshold comprises a provisioned I/O performance metric associated with the persistent storage volume attached to the client application, wherein the provisioned I/O performance metric comprises at least one of a provisioned I/O per second (IOPS) and an I/O throughput.

4. The method of claim 1, wherein writing the data of the I/O write request to the non-persistent write cache in the non-persistent storage volume comprises:

writing the data to a primary non-persistent write cache in a first non-persistent storage volume in a first fault domain; and writing a copy of the data to a secondary non-persistent write cache in a second non-persistent storage volume in a second fault domain.

5. The method of claim 4, wherein writing the data of the I/O write request to the persistent write cache in the persistent storage volume comprises:

writing the data to a primary persistent write cache in a first persistent storage volume in the first fault domain; and writing a copy of the data to a secondary persistent write cache in a second persistent storage volume in the first fault domain.

6. The method of claim 5, wherein the first and second fault domains comprise first and second availability zones of a public cloud computing system.

7. The method of claim 1, wherein the persistent storage volume with the persistent write cache, the non-persistent storage volume with the non-persistent write cache, and the primary storage volume reside on storage nodes within a same availability zone.

8. The method of claim 1, wherein cache entries in the persistent write cache and the non-persistent write cache are each labeled with a unique number of a shared number sequence, to enable the storage control system to determine an order of data writes to the persistent and non-persistent write caches.

9. A computer program product comprising a non-transitory processor-readable storage medium having stored therein program code of one or more software programs, wherein the program code when executed by at least one processing device causes the at least one processing device to implement a storage control system that is configured to perform a write caching process which comprises:

receiving, by a storage control system, an input/output (I/O) write request from a client application to write data to a primary storage volume;

comparing, by the storage control system, a current I/O workload associated with the client application to an I/O workload threshold; and writing, by the storage control system, the data of the I/O write request to one of (i) a persistent write cache in a persistent storage volume and (ii) a non-persistent write cache in a non-persistent storage volume, based at least in part on a result of comparing the current I/O workload to the I/O workload threshold.

10. The computer program product of claim 9, wherein:

the program code for comparing the current I/O workload associated with the client application to the I/O workload threshold comprises program code for determining whether the current I/O workload associated with the client application exceeds the I/O workload threshold;

in response to determining that the current I/O workload does not exceed the I/O workload threshold, the data of the I/O write request is written to the persistent write cache in the persistent storage volume; and in response to determining that the current I/O workload does exceed the I/O workload threshold, the data of the I/O write request is written to the non-persistent write cache in the non-persistent storage volume.

11. The computer program product of claim 9, wherein the I/O workload threshold comprises a provisioned I/O performance metric associated with the persistent storage volume attached to the client application, wherein the provisioned I/O performance metric comprises at least one of a provisioned I/O per second (IOPS) and an I/O throughput.

12. The computer program product of claim 10, wherein the program code for writing the data of the I/O write request to the non-persistent write cache in the non-persistent storage volume comprises program code for:

writing the data to a primary non-persistent write cache in a first non-persistent storage volume in a first fault domain; and writing a copy of the data to a secondary non-persistent write cache in a second non-persistent storage volume in a second fault domain.

13. The computer program product of claim 12, wherein the program code for writing the data of the I/O write request to the persistent write cache in the persistent storage volume comprises program code for:

writing the data to a primary persistent write cache in a first persistent storage volume in the first fault domain; and writing a copy of the data to a secondary persistent write cache in a second persistent storage volume in the first fault domain.

14. The computer program product of claim 9, wherein cache entries in the persistent write cache and the non-persistent write cache are each labeled with a unique number of a shared number sequence, to enable the storage control system to determine an order of data writes to the persistent and non-persistent write caches.

15. A cloud computing system, comprising:

a distributed data storage system which comprises plurality of storage nodes, wherein at least one storage node comprises at least one processing device, and memory to store program instructions that are executed by the at least one processing device to implement a storage control system that is configured to perform a write caching process, wherein in performing the write caching process, the storage control system is configured to:

receive an input/output (I/O) write request from a client application to write data to a primary storage volume;

compare a current I/O workload associated with the client application to an I/O workload threshold; and write the data of the I/O write request to one of (i) a persistent write cache in a persistent storage volume and (ii) a non-persistent write cache in a non-persistent storage volume, based at least in part on a result of comparing the current I/O workload to the I/O workload threshold.

16. The cloud computing system of claim 15, wherein:
in comparing the current I/O workload associated with the client application to the I/O workload threshold, the storage control system is configured to determine whether the current I/O workload associated with the client application exceeds the I/O workload threshold;
in response to determining that the current I/O workload does not exceed the I/O workload threshold, the data of the I/O write request is written to the persistent write cache in the persistent storage volume; and
in response to determining that the current I/O workload does exceed the I/O workload threshold, the data of the I/O write request is written to the non-persistent write cache in the non-persistent storage volume.

17. The cloud computing system of claim 15, wherein the I/O workload threshold comprises a provisioned I/O performance metric associated with the persistent storage volume attached to the client application, wherein the provisioned I/O performance metric comprises at least one of a provisioned I/O per second (IOPS) and an I/O throughput.

18. The cloud computing system of claim 15, wherein:
the plurality of storage nodes comprises a first group of storage nodes that are located in a first availability zone and a second group of storage nodes that are located in a second availability zone;
in writing the data of the I/O write request to the non-persistent write cache in the non-persistent storage volume, the storage control system is configured to:
write the data to a primary non-persistent write cache in a first non-persistent storage volume in a storage node in the first availability zone; and
write a copy of the data to a secondary non-persistent write cache in a second non-persistent storage volume in a storage node in the second availability zone.

19. The cloud computing system of claim 18, wherein in writing the data of the I/O write request to the persistent write cache in the persistent storage volume, the storage control system is configured to:
write the data to a primary persistent write cache in a first persistent storage volume in the first availability zone; and
write a copy of the data to a secondary persistent write cache in a second persistent storage volume in the first availability zone.

20. The cloud computing system of claim 16, wherein cache entries in the persistent write cache and the non-persistent write cache are each labeled with a unique number of a shared number sequence, to enable the storage control system to determine an order of data writes to the persistent and non-persistent write caches.

* * * * *